United States Patent
Mizuno

(10) Patent No.: US 7,286,615 B2
(45) Date of Patent: Oct. 23, 2007

(54) FSK SIGNAL DETECTOR

(75) Inventor: Koutaro Mizuno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 679 days.

(21) Appl. No.: 10/859,353

(22) Filed: Jun. 3, 2004

(65) Prior Publication Data

US 2005/0105653 A1 May 19, 2005

(30) Foreign Application Priority Data

Nov. 19, 2003 (JP) .............................. 2003-389033

(51) Int. Cl.
*H04L 27/14* (2006.01)
*H03D 3/00* (2006.01)

(52) U.S. Cl. ...................................... 375/334; 329/300

(58) Field of Classification Search ........ 375/334–337; 329/300–303
See application file for complete search history.

(56) References Cited

U.S. PATENT DOCUMENTS 5,539,355 A * 7/1996 Nakamura .................. 329/302
5,825,243 A * 10/1998 Sato et al. .................. 329/311
6,643,336 B1 * 11/2003 Hsieh et al. ................ 375/343
6,836,520 B1 * 12/2004 Chen et al. ................. 375/354

FOREIGN PATENT DOCUMENTS

JP            9-036924         2/1997

* cited by examiner

*Primary Examiner*—Don N. Vo
(74) *Attorney, Agent, or Firm*—Nixon Peabody LLP; Donald R. Studebaker

(57) ABSTRACT

A detector includes a binarizer for binarizing the amplitude of an input FSK signal; a 2n-stage shift register having 2n registers for sequentially shifting the FSK signal binarized by the binarizer in response to a clock; and an adder for calculating a sum of a total number of FSK signals having the value of "1" or "0" among FSK signals stored in a first to an n-th register of the 2n-stage shift register and a total number of FSK signals having the value of "0" or "1" among FSK signals stored in an (n+1)th to a 2n-th register.

7 Claims, 10 Drawing Sheets

OUTPUT WAVEFORM OF LIMITER AMPLIFIER 10

OUTPUT WAVEFORM OF COMPARATOR 12

OUTPUT WAVEFORM OF ADDER 18

OUTPUT WAVEFORM OF ADDER 18

OUTPUT WAVEFORM OF ADDER 20

OUTPUT WAVEFORM OF ADDER 20

OUTPUT WAVEFORM OF ABSOLUTE VALUE CONVERTER 22

OUTPUT WAVEFORM OF ABSOLUTE VALUE CONVERTER 22

OUTPUT WAVEFORM OF ABSOLUTE VALUE CONVERTER 22

OUTPUT WAVEFORM OF DIGITAL LPF 24

OUTPUT WAVEFORM OF COMPARATOR 26

OUTPUT WAVEFORM OF DIGITAL LPF 24

WAVEFORM OF FREQUENCY DETECTION OUTPUT (A)
GENERATED IN SUBTRACTOR

FSK DATA OUTPUT FROM SUBTRACTOR 34

FSK SIGNAL DETECTOR

BACKGROUND OF THE INVENTION

1. Field of the Invention

The present invention relates to an FSK (Frequency Shift Keying) signal detector for detecting an FSK signal, and more particularly, to an FSK signal detector for detecting an FSK signal through digital processing.

2. Description of the Related Art

FIG. 19 illustrates an example of conventional FSK signal detector for detecting an FSK signal through digital processing. In this FSK signal detector, a quadrature detector circuit comprising an oscillator 100, a $\pi/2$ phase shifter 102, and multipliers 104, 106 is used to decompose a received IF signal 118 input thereto into baseband signals, i.e., I signal and Q signal, through quadrature detection. Then, A/D converters (ADC) 108, 110 are used to quantize the I, Q signals, respectively, to generate digital data representing amplitude information. A phase detector 112, for example, having a table indicating the relationship between the amplitudes of the I, Q signals to $\tan^{-1}\theta$ is used to generate phase information corresponding to the amplitudes of the I, Q signals. Then, a one-symbol delay circuit 114 and a phase transition determination circuit 116 are used to obtain a one-symbol delay difference of the phase information generated from the amplitudes of the I, Q signals to detect how the phase has changed, and outputs a detection signal 120.

For example, when a phase difference $\theta_2-\theta_1$ is positive, where $\theta_1$ represents the phase at a symbol S1, and $\theta_2$ represents the phase detected at a symbol S2 one symbol after the symbol S1, the phase has advanced during a transition from the symbol S1 to the symbol S2, resulting in a higher frequency at the symbol S2 as compared with that at the symbol S1. On the other hand, when a phase difference $\theta_3-\theta_1$ is negative, where $\theta_1$ represents the phase at the symbol S1, and $\theta_3$ represents the phase detected at a symbol S3 one symbol after the symbol S1, the phase has delayed during a transition from the symbol S1 to the symbol S3, resulting in a lower frequency at the symbol S3 as compared with that at the symbol S1. In this way, the FSK signal detector in FIG. 19 detects the frequency of the FSK signal 118 by converting a phase shift between symbols to a frequency shift. Reference can be made to, for example, Japanese Patent Laid-Open Publication Kokai No. H09-36924.

However, the foregoing FSK signal detector detects the frequency on the basis of the amplitude information of the I, Q signals, fluctuations in the amplitudes of the I, Q signals due to noise and the like, if any, would adversely affect the characteristic of the frequency detection. Also, the FSK signal detector is problematic in that it needs such parts as A/D converters, and involves a complicated circuit configuration because the amplitude information of the I, Q signals is represented using a plurality of bits.

SUMMARY OF THE INVENTION

It is an object of the present invention to overcome the disadvantages of the prior art as mentioned above and to provide an FSK signal detector in a simple circuit configuration which prevents fluctuations in the amplitude of an FSK signal from adversely affecting the characteristic of frequency detection.

To solve the foregoing problems, the present invention provides an FSK signal detector which is characterized by including binarizing means for binarizing the amplitude of an input FSK signal; a 2n-stage shift register comprised of 2n registers for sequentially shifting the FSK signal binarized by the binarizing means in response to a clock; and adding means for calculating a sum of a total number of FSK signals having the value of "1" or "0" among FSK signals stored in a first to an n-th register of the 2n-stage shift register and a total number of FSK signals having the value of "0" or "1" among FSK signals stored in an (n+1)th to a 2n-th register.

In the foregoing configuration, amplitude limiting means may be provided in front of the binarizing means for suppressing an amplitude fluctuation component of the input FSK signal.

The FSK signal detector of the present invention is further characterized by including FSK data generating means for generating FSK data based on a varying width when the sum calculated by the adding means varies in accordance with the clock supplied to the 2n-stage shift register.

In this configuration, the FSK generating means may be comprised of subtracting means for subtracting "n" from the sum calculated by the adding means; absolute value converting means for obtaining an absolute value of the output of the subtracting means; a low pass filter for averaging the output of the absolute value converting means; and comparing means for comparing the output of the low pass filter with a predetermined threshold to generate FSK data.

The FSK generating means may include DC offset generating means, operative when the output of the low pass filter corresponds to a preamble added to the head of the FSK signal, for averaging an output corresponding to the preamble to generate a DC offset, and for holding the DC offset for a frame period of the FSK signal, wherein the comparing means may subtract the DC offset generated by the DC offset generating means from the output of the low pass filter, and compare the difference with a threshold having the value of zero to generate the FSK data.

According to the present invention, an input FSK signal is converted to a binarized signal having the amplitude of "0", "1" by the binarizing means, and the frequency of the binarized signal is detected through digital processing using the 2n-stage shift register and adding means, so that the circuit configuration can be simplified without the need for using parts such as an A/D converter.

Also, the amplitude fluctuation component of the input FSK signal is suppressed by the amplitude limiting means, and its amplitude is binarized by the binarizing means, so that the detection characteristic can be made less susceptible to fluctuations in amplitude, unlike the conventional detection scheme which obtains the phase from the amplitudes of I, Q signals.

Further, the FSK signal detector generates a DC offset which varies in accordance with a frequency offset included in the FSK signal, and cancels a frequency offset component included in the frequency detection output by this DC offset, so that the FSK data can be generated from the frequency detection output without being affected by the frequency offset.

DETAILED DESCRIPTION OF THE INVENTION

Figure 1:
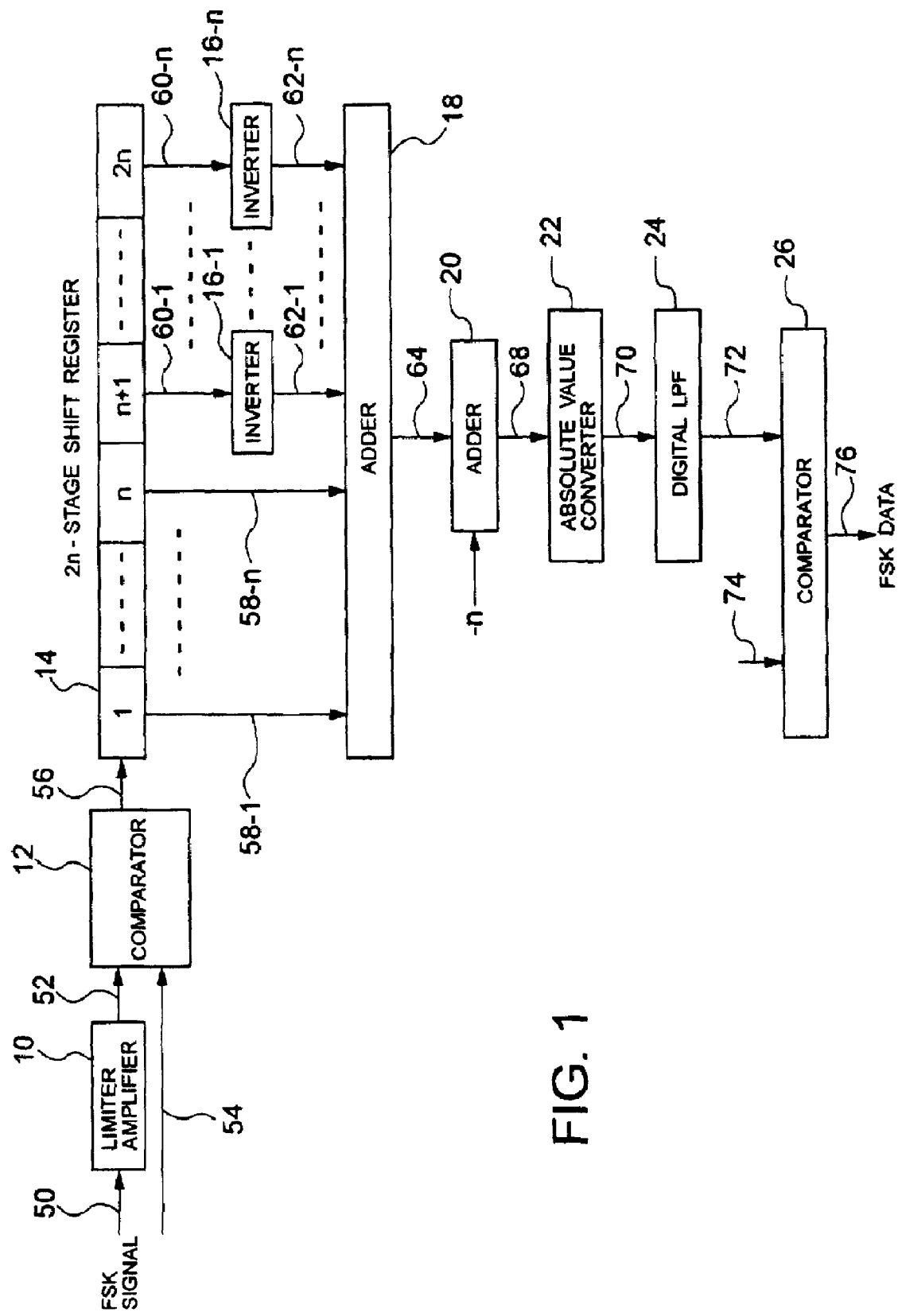
FIG. 1 is a block diagram illustrating an embodiment of an FSK signal detector according to the present invention.

Embodiments of an FSK signal detector according to the present invention will be described in detail with reference to the accompanying drawings. Referring to FIG. 1, the FSK signal detector of the embodiment detects the frequency of an FSK signal through digital processing to output FSK data 76, and comprises a limiter amplifier 10, comparators 12, 26, a 2n-stage shift register 14, inverters 16-1-16-n, adders 18, 20, an absolute value converter 22, and a digital LPF (low pass filter) 24. In FIG. 1, reference numerals added to connection lines indicate signals which appear on those connection lines.

Figure 2:
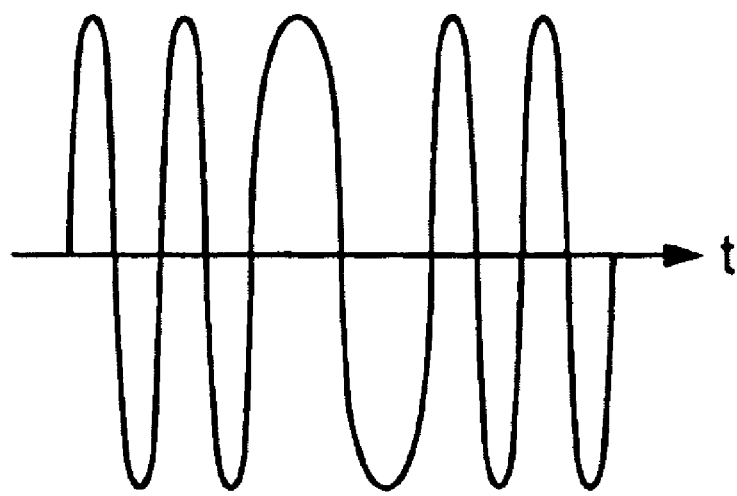
FIG. 2 is a diagram showing an FSK signal output from a limiter amplifier 10 of the FSK signal detector illustrated in FIG. 1.

The limiter amplifier 10 is applied with the FSK signal 50 which has been down-converted from a high-frequency received signal to an IF received signal of several MHz. The limiter amplifier 10 is an amplitude limiting circuit which limits the amplitude of the FSK signal 50 to suppress an amplitude fluctuating component thereof. With this circuit, the frequency detection can be made without being affected by fluctuations in amplitude. The limiter amplifier 10 outputs the signal with the suppressed amplitude fluctuation component as an FSK signal 52. FIG. 2 shows an exemplary waveform of the FSK signal 52 output from the limiter amplifier 10.

Figure 3:
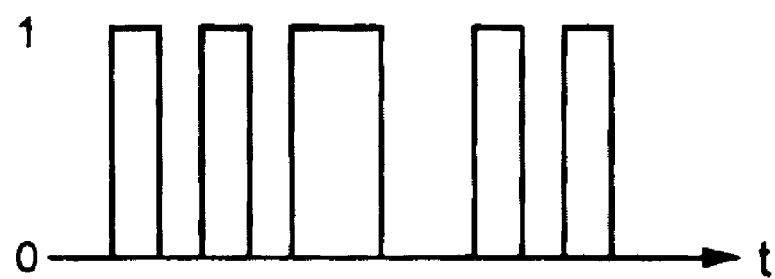
FIG. 3 is a diagram showing an FSK signal output from a comparator 12 of the FSK signal detector illustrated in FIG. 1.

The comparator 12 connected to the limiter amplifier 10 is a binarizer circuit which binarizes the amplitude of the FSK signal 52 output from the limiter amplifier 10. Specifically, the comparator 12 compares amid-point potential 54 substantially equal to a mid-point level of the FSK signal 52 with the FSK signal 52 to generate and output an FSK signal 56 which has the value of "1" when the amplitude of the FSK signal 52 is larger than the mid-point potential 54, and the value of "0" when the amplitude of the FSK signal 52 is smaller than the mid-point potential 54. In this way, circuits subsequent to the comparator 12 onward can handle the amplitude of the FSK signal as a digital signal of "1", "0". FIG. 3 shows an exemplary waveform of the FSK signal 56 output from the comparator 12.

The 2n-stage shift register 14 connected to the comparator 12, which is a shift-register comprised of 2n stages of registers, sequentially receives the FSK signal 56 output from the comparator 12 in response to a clock CLK (not shown) supplied from the outside, and sequentially shifts the received FSK signal to the output. Assuming herein that the center frequency of the FSK signal 56 is $f_{IF}$; maximum frequency shifts are $\pm\Delta f_d$; the frequency is $f_{IF+}(=f_{IF}+\Delta f_d)$ when the FSK signal 56 shifts in frequency in the plus direction; and the frequency is $f_{IF-}(=f_{IF}-\Delta f_d)$ when the FSK signal 56 shifts in frequency in the minus direction, the frequency of the clock CLK (operating clock frequency) $f_{CLK}$ is preferably set to a value which satisfies $(f_{CLK}/f_{IF-})-(f_{CLK}/f_{IF+})=8$, as will be later described.

The number of stages 2n of the 2n-stage shift register 14 is set to $2n \approx f_{CLK}/f_{IF-}$ in this embodiment. However, assume that this equation indicates that when its quotient is even, the quotient is set to 2n, and otherwise, the even number closest to the quotient is set to 2n. In this event, when the FSK signal 56 is shifted to the frequency $f_{IF-}$, the 2n-stage shift register 14 can store about one cycle of the FSK signal 56. When the FSK signal 56 is shifted to the frequency $f_{IF+}$, the 2n-stage shift register 14 can store about $(1+8f_{IF+}/f_{CLK})$ cycles of the FSK signal for the frequency $f_{CLK}$ of the clock CLK which is selected to satisfy $(f_{CLK}/f_{IF-})-(f_{CLK}/f_{IF+})=8$.

Outputs of the first to n-th registers among the registers making up the 2n-stage shift register 14 are each connected to the adder 18, so that FSK signals 58-1-58-n output from the registers at the respective stages are input to the adder 18. Also, outputs of the (n+1)th to 2n-th registers are connected to the adder 18 through inverters 16-1-16-n. The inverters 16-1-16-n invert FSK signals 60-1-60-n output from the (n+1)th to 2n-th registers (converts "1" to "0" and "0" to "1", respectively), and outputs the signals to the adder 18 as FSK signals 62-1-62-n.

The adder 18 counts the number of the FSK signals having the value of "1" among the FSK signals 58-1-58-n and FSK signals 62-1-62-n, and delivers a frequency detection output 64 indicating the counted number. The number of the FSK signals having the value of "1" is equal to a total of the number of FSK signals having the value of "1" among the FSK signals stored in the first to n-th registers of the 2n-stage shift register 14, and the number of FSK signals having the value of "0" among the FSK signals stored in the (n+1)th to 2n-th registers. Alternatively, the inverters 16-1-16-n may be omitted by providing the adder 18 with a capability of counting the number of FSK signals having the value of "1" among the FSK signal 58-1-58-n and the number of FSK signals having the value of "0" among the FSK signals 60-1-60-n.

Figure 4:
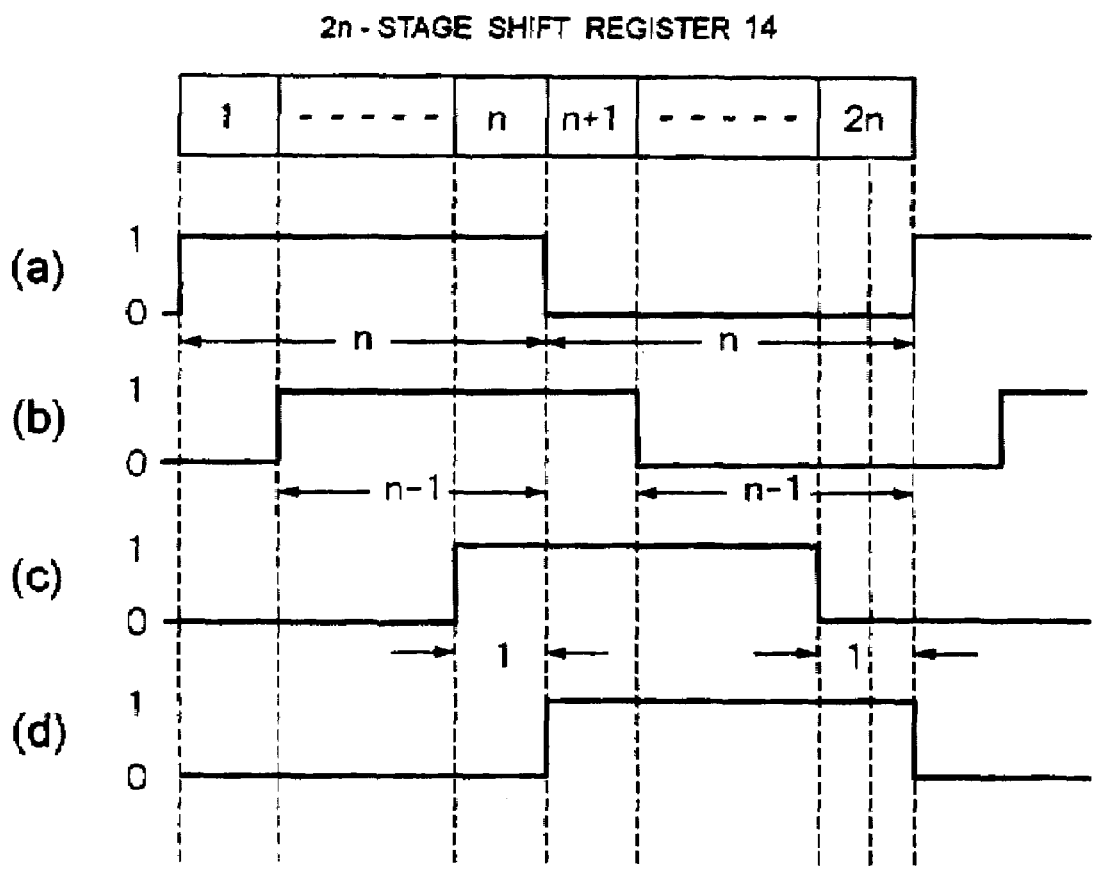
FIG. 4 is a diagram showing the operation of an 2n-stage shift register 14 when the FSK signal detector illustrated in FIG. 1 is applied with an FSK signal, the frequency of which is shifted to $f_{IF-}$.
Figure 6:
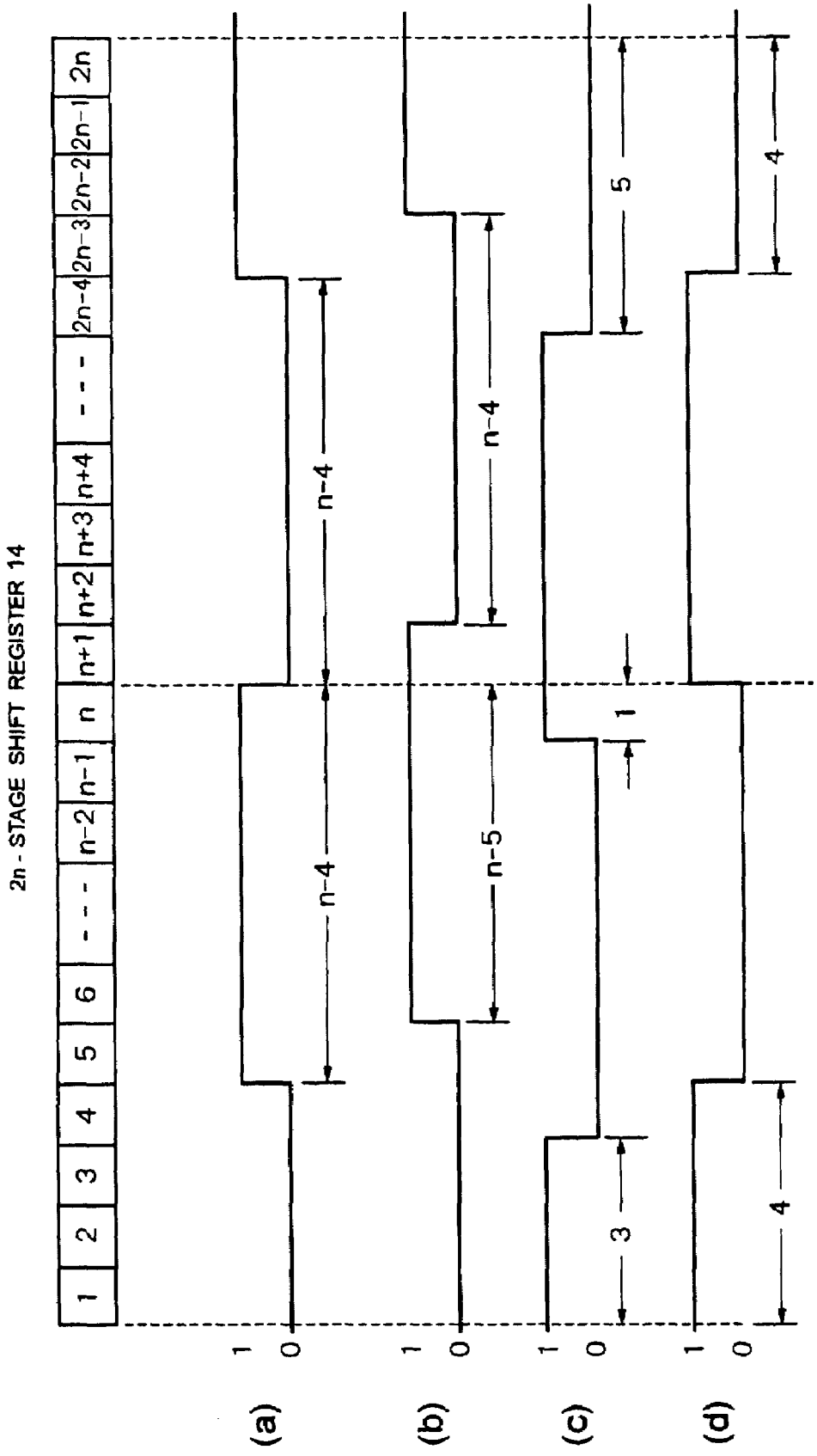
FIG. 6 is a diagram showing the operation of an 2n-stage shift register 14 when the FSK signal detector illustrated in FIG. 1 is applied with an FSK signal, the frequency of which is shifted to $f_{IF+}$.

FIGS. 4 and 6 show how the FSK signals stored in the first to 2n-th registers, respectively, of the 2n-stage shift register 14 change in accordance with the clock CLK. FIG. 4 shows a change in a storage state when the FSK signal 56 shifted to the frequency $f_{IF-}$ is input, while FIG. 6 shows a change in a storage state when the FSK signal 56 shifted to the frequency $f_{IF+}$ is input. Assume that the frequency $F_{CLK}$ of the clock CLK is selected to satisfy $(f_{CLK}/f_{IF-})-(f_{CLK}/f_{IF+})=8$, and that the number of stages of the 2n-stage shift register 14 is set to $2n \approx f_{CLK}/f_{IF-}$.

First, (a) in FIG. 4 shows that one cycle of FSK signals has been stored in the first to 2n-th registers of the 2n-stage shift register 14; (b) in FIG. 4 shows that the FSK signals have been shifted by one clock toward the output from the state of (a) in FIG. 4; (c) in FIG. 4 shows that the FSK signals have been shifted by n–2 clocks toward the output from the state of (b) in FIG. 4; and (d) in FIG. 4 shows that the FSK signals have been shifted by one clock toward the output from the state of (c) in FIG. 4.

Figure 5:
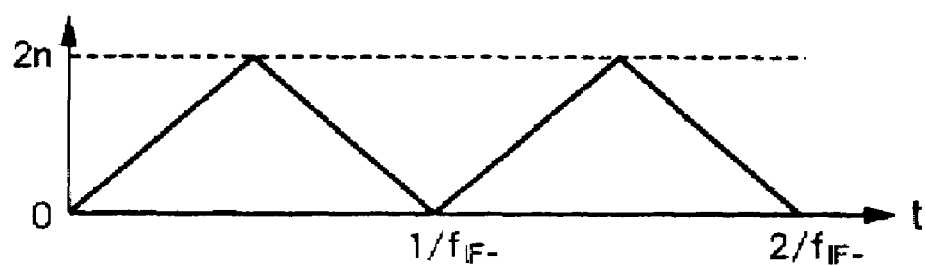
FIG. 5 is a diagram showing a frequency detection output delivered from an adder 18 when the FSK signal detector illustrated in FIG. 1 is applied with an FSK signal, the frequency of which is shifted to $f_{IF-}$.

In the state shown in (a) in FIG. 4, the number of FSK signals having the value of "1" is n among the FSK signal stored in the first to n-th registers, and the number of FSK signals having the value of "0" is n among the FSK signals stored in the (n+1) th to 2n-th registers, so that the adder 18 generates the frequency detection output 64 equal to 2n. Similarly, the frequency detection outputs 64 of (b), (c), (d) in FIG. 4 are equal to 2n–2, 2, 0, respectively. Therefore, the frequency detection output 64 periodically varies between the maximum value 2n and the minimum value 0 in response to the clock CLK as shown in FIG. 5. While the frequency detection output 64 is shown as linearly varying in FIG. 5, it actually varies step by step in response to the clock CLK.

Next, (a) in FIG. 6 shows that one cycle of FSK signals has been stored in the fifth to (2n–4)-th registers of the 2n-stage shift register 14; (b) in FIG. 6 shows that the FSK signals have been shifted by one clock toward the output from the state of (a) in FIG. 6; (c) in FIG. 6 shows that the FSK signals have been shifted by (n–6) clocks toward the output from the state of (b) in FIG. 6; and (d) in FIG. 6 shows that the FSK signals have been shifted by one clock toward the output from the state of (c) in FIG. 6.

In the state of (a) in FIG. 6, the number of FSK signals having the value of "1" is (n–4) among the FSK signal stored in the first to n-th registers, and the number of FSK signals having the value of "0" is (n–4) among the FSK signals stored in the (n+1)th to 2n-th registers, so that the adder 18 generates the frequency detection output 64 equal to (2n–8). Similarly, the frequency detection outputs 64 of (b), (c), 6(d) in FIG. 6 are equal to (2n–9), 9, 8, respectively. Therefore, the frequency detection output 64 periodically varies between the maximum value (2n–8) and he minimum value 8 in response to the clock CLK as shown in FIG. 7.

Figure 7:
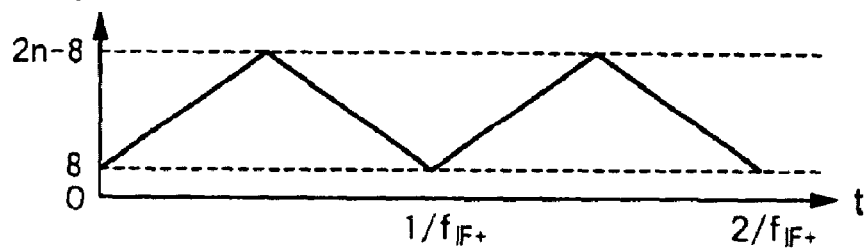
FIG. 7 is a diagram showing a frequency detection output delivered from the adder 18 when the FSK signal detector illustrated in FIG. 1 is applied with an FSK signal, the frequency of which is shifted to $f_{IF-}$.

In this way, a varying width (=maximum value–minimum value) of the amplitude of the frequency detection output 64 is equal to 2n, as shown in FIG. 5, when the 2n-stage shift register 14 is applied with the FSK signal 56 with the frequency shifted to $f_{IF-}$, and to (2n–16), as shown in FIG. 7, when the 2n-stage shift register 14 is applied with the FSK signal 56 with the frequency shifted to $f_{IF+}$. Thus, the varying width of the frequency detection output 64 varies in accordance with the frequency shift of the FSK signal, so that the frequency shift of the FSK signal 56 can be determined based on the varying width of the frequency detection output 64. In other words, the 2n-stage shift register 14, inverters 16-1-16-n, and adder 18 operate as a frequency detector for detecting a frequency.

Assuming $(f_{CLK}/f_{IF-})-(f_{CLK}/f_{IF+})=K$, the varying width of the frequency detection output 64 with respect to the FSK signal 56 shifted to the frequency $f_{IF-}$ is 2n, while the varying width of the frequency detection output 64 to the FSK signal 56 shifted to the frequency $f_{IF+}$ is (2n-2K), the difference between the varying widths is 2K. Thus, when the operating clock frequency $f_{CLK}$ is selected to increase K, the FSK signal frequency shifted to the frequency $f_{IF-}$ is readily distinguished from the FSK signal frequency shifted to the frequency $f_{IF+}$. In this event, however, the number of stages in the 2n-stage shift register 14 will increase.

While in the embodiment of FIG. 1, the inverters 16-1-16-n are inserted between the outputs of the (n+1)th to 2n-th registers of the 2n-stage shift register 14 and the adder 18, the inverters may be inserted between the outputs of the first to n-th registers and the adder 18, respectively, such that the adder 18 may count the number of FSK signals having the value of "0" among the FSK signals output from the respective inverters and the FSK signals output from the (n+1)th to 2n-th registers. The counted value is equal to a total of the number of FSK signals having the value of "1" among the FSK signals stored in the first to 2n-th registers and the number of FSK signals having the value of "0" among the FSK signals stored in the (n+1)th to 2n-th registers.

The adder 20, the absolute value converter 22, the digital LPF 24, and the comparator 26, disposed behind the adder 18 constitute an FSK data generating means for generating FSK data 76.

First, the adder 20 is an adder circuit for adding –n to the frequency detection output 64 delivered from the adder 18, and generates the addition result as a frequency detection output 68. In this way, the frequency detection output 64 is converted to a waveform, the width of which varies about zero. For example, when the FSK signal 56 is shifted to the frequency $f_{IF-}$, the adder 20 is applied with the frequency detection output 64 having the waveform shown in FIG. 5, and therefore delivers the frequency converted output 68 having the waveform shown in FIG. 8. On the other hand, when the FSK signal 56 is shifted to the frequency $f_{IF+}$, the adder 20 is applied with the frequency detection output 64 having the waveform shown in FIG. 7, and therefore delivers the frequency converted output 68 having the waveform shown in FIG. 9. The adder circuit 20 may be replaced with a subtractor for subtracting n from the frequency detection output 64, as a matter of course.

Figure 10:
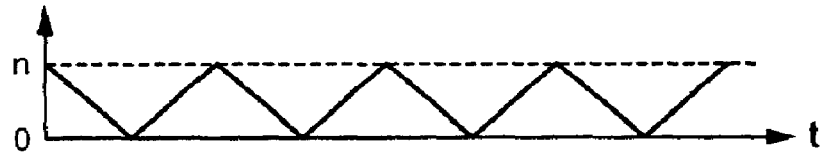
FIG. 10 is a diagram showing a frequency detection output delivered from an absolute value converter 22 when the FSK signal detector illustrated in FIG. 1 is applied with an FSK signal, the frequency of which is shifted to $f_{IF-}$.
Figure 11:
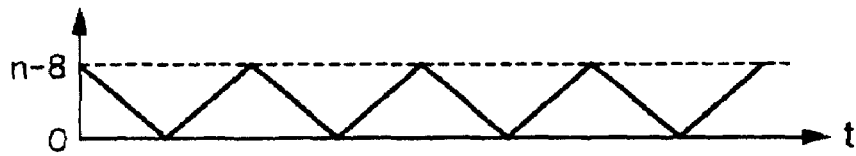
FIG. 11 is a diagram showing a frequency detection output delivered from the absolute value converter 22 when the FSK signal detector illustrated in FIG. 1 is applied with an FSK signal, the frequency of which is shifted to $f_{IF+}$.
Figure 12:
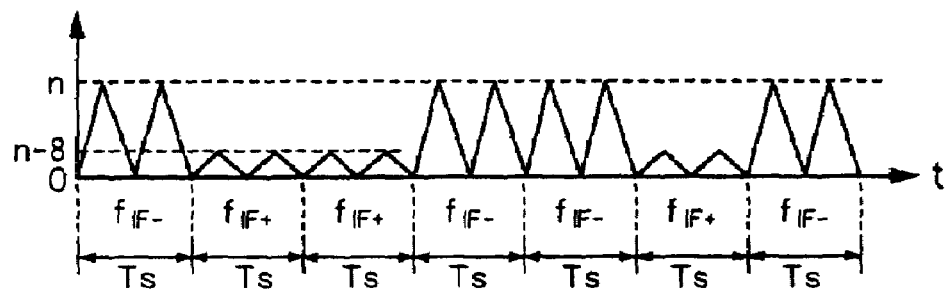
FIG. 12 is a diagram showing a frequency detection output delivered from the absolute value converter 22 when the FSK signal detector illustrated in FIG. 1 is applied with an FSK signal, the frequency of which is shifted to $f_{IF-}$ or to $f_{IF+}$.

The absolute value converter 22 connected to the adder 20 calculates the absolute value of the frequency detection output 68 delivered from the adder 20, and provides the absolute value as a frequency detection output 70. For example, the absolute value converter 22 delivers the frequency detection output 70 having the waveform shown in FIG. 10 when it is applied with the frequency detection output 68 having the waveform shown in FIG. 8, and delivers the frequency detection output 70 having the waveform shown in FIG. 11 when it is applied with the frequency detection output 68 having the waveform shown in FIG. 9. Therefore, when the frequency of the FSK signal 50 is sequentially shifted to $f_{IF-}$, $f_{IF+}$, $f_{IF+}$, $f_{IF-}$, $f_{IF-}$, $f_{IF+}$, $f_{IF-}$, the frequency detection output 70 delivered from the absolute value converter 22 varies as shown in FIG. 1. In FIG. 12, Ts represents one symbol duration of the FSK signal.

The digital LPF 24 connected to the absolute value converter 22 is a low pass filter which takes a moving average over the width of one symbol section for the frequency detection output 70 delivered from the absolute value converter 22 in one symbol duration Ts of the FSK signal, and converts the frequency detection output 70 to a frequency detection output 72 which has the amplitude varying in accordance with the frequency shift of the FSK signal, and delivers the frequency detection output 72. For example, the digital LPF 24 delivers a frequency detection output 72 having the waveform shown in FIG. 13 when it is applied with the frequency detection output 70 having the waveform shown in FIG. 12.

Figure 13:
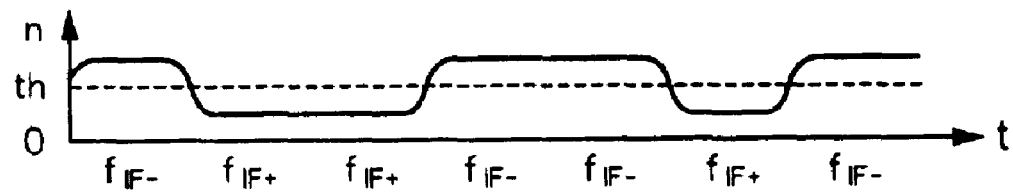
FIG. 13 is a diagram showing a frequency detection output delivered from a digital LPF 24 of the FSK signal detector illustrated in FIG. 1.

The comparator 26 connected to the digital LPF 24 is a comparator which compares the frequency detection output 72 delivered from the digital LPF 24 with a threshold 74 input thereto from the outside to generate and output FSK data 76 corresponding to the frequency shift of the FSK signal. The threshold 74 is set, for example, to an average of the amplitude of the frequency detection output 72 when the FSK signal is shifted to the frequency $f_{IF-}$ and the amplitude of the frequency detection output 72 when the FSK signal is shifted to the frequency $f_{IF+}$. An indication "th" in FIG. 13 is an example of the thus set threshold 74.

Figure 14:
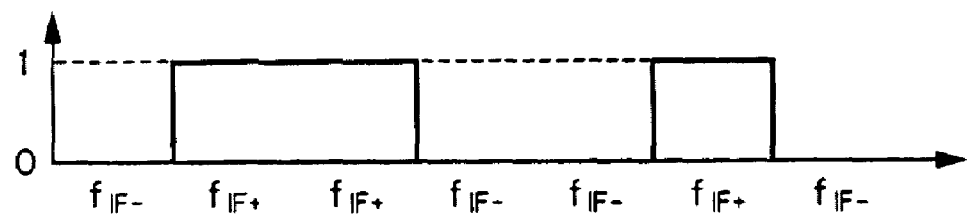
FIG. 14 is a diagram showing FSK data output from a comparator 26 of the FSK signal detector illustrated in FIG. 1.

Generally, in the FSK data, "0" corresponds to the FSK signal which is shifted to the frequency $f_{IF-}$, and "1" corresponds to the FSK signal which is shifted to the frequency $f_{IF+}$, respectively. In consideration of the general situation, the comparator 26 in this embodiment outputs "0" when the frequency detection output 72 is larger than the threshold 74 because the FSK signal is shifted to the frequency $f_{IF-}$, and "1" when the frequency detection output 72 is smaller than the threshold 74 because the FSK signal is frequency shifted to the frequency $f_{IF+}$. Therefore, the comparator 26 outputs the FSK data 76 having the waveform shown in FIG. 14 when it is applied with the frequency detection output 72 having the waveform shown in FIG. 13.

Describing the operation of the FSK signal detector configured as described above, the limiter amplifier 10 provides a constant amplitude for the FSK signal 50 input thereto, and outputs this to the comparator 12 as the FSK signal 52. The comparator 12 compares the FSK signal 52 with the mid-point potential 54 to binarize the FSK signal 52 which is then output to the 2n-stage shift register 14 as the FSK signal 56.

The 2n-stage shift register 14 sequentially receives the FSK signal 56 in response to the clock CLK supplied thereto from the outside, sequentially shifts the FSK signal 56 toward the output, outputs FSK signals in the first to n-th registers to the adder 18 as FSK signals 58-1-58-n, and outputs FSK signals in the (n+1)-th to 2n-th registers to the inverters 16-1-16-n as FSK signals 60-1-60-n. The inverters 16-1-16-n invert the FSK signals 60-1-60-n, respectively, and output them to the adder 18 as FSK signals 62-1-62-n.

The adder 18 counts the number of FSK signals having the value of "1" among the FSK signals 58-1-58-n output from the 2n-stage shift register 14 and the FSK signals 62-1-62-n output from the inverters 16-1-16-n to generate the frequency detection output 64 which has the amplitude with a width that varies in accordance with the frequency shift ($f_{IF} \pm \Delta f_d$) of the FSK signal for delivery to the adder 20. In this embodiment, the varying width of the amplitude of the frequency detection output 64 is 2n, as shown in FIG. 5, when the 2n shift register 14 is applied with the FSK signal 56 which is shifted to the frequency $f_{IF-}$, and (2n−16), as shown in FIG. 7, when the 2n shift register 14 is applied with the FSK signal 56 which is shifted to the frequency $f_{IF+}$, so that the varying width with respect to the frequency shift to the frequency $f_{IF-}$ is larger than the varying width with respect to the frequency shift to the frequency $f_{IF+}$.

Figure 8:
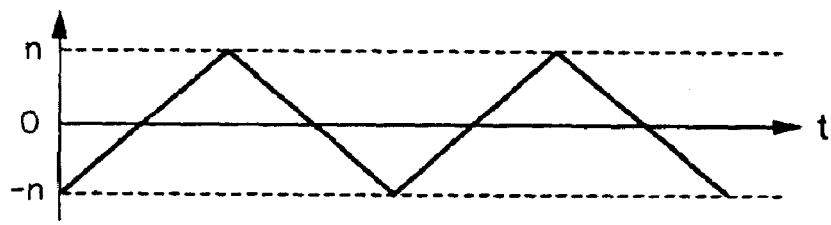
FIG. 8 is a diagram showing a frequency detection output delivered from an adder 20 when the FSK signal detector illustrated in FIG. 1 is applied with an FSK signal, the frequency of which is shifted to $f_{IF-}$.
Figure 9:
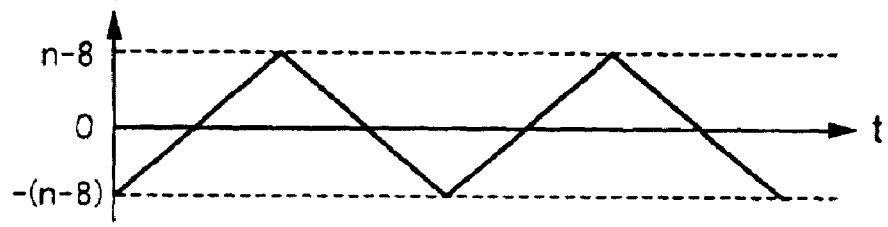
FIG. 9 is a diagram showing a frequency detection output delivered from the adder 20 when the FSK signal detector illustrated in FIG. 1 is applied with an FSK signal, the frequency of which is shifted to $f_{IF+}$.

The adder 20 adds −n to the frequency detection output 64 from the adder 18, converts the level of the frequency detection output 64 such that a portion of the frequency detection output 64 corresponding to an average value (n) of the maximum and minimum is zero, and delivers this to the absolute value converter 22 as the frequency detection output 68. For example, the frequency detection outputs 64 shown in FIGS. 5, 7 are converted to the frequency detection outputs 68 shown in FIGS. 8, 9, respectively. The absolute value converter 22 generates the absolute value of the frequency detection output 68 from the adder 20, and delivers the absolute value to the digital LPF 24 as the frequency detection output 70. For example, the frequency detection outputs 68 shown in FIGS. 8, 9 are converted to frequency detection outputs 70 shown in FIGS. 10, 11, respectively.

The digital LPF 24 takes a moving average over the width of one symbol section in one symbol duration Ts of the FSK signal for the frequency detection output 70 from the absolute value converter 22 for conversion to the frequency detection output 72, the amplitude of which varies in accordance with frequency shift of the FSK signal, which is delivered to the comparator 26. For example, the frequency detection output 70 shown in FIG. 12 is converted to the frequency detection output 72 shown in FIG. 13 by the digital LPF 24.

The comparator 26 compares the frequency detection output 72 from the digital LPF 24 with the threshold 74 input thereto from the outside to generate the FSK data 76 corresponding to the frequency shift of the FSK signal, and outputs the FSK data 76. Specifically, the comparator 26 generates and outputs the FSK data 76 which is "0" when the frequency detection output 72 is larger than the threshold 74, and "1" when the frequency detection output 72 is smaller than the threshold 74. For example, the frequency detection output 72 shown in FIG. 13 is converted to the FSK data 76 shown in FIG. 14 by the comparator 26. In this way, the input FSK signal 50 is digitally processed by the FSK signal detector for demodulation.

According to the embodiment, since the amplitude fluctuation component of the input FSK signal 50 is suppressed by the limiter amplifier 10, the detection characteristic is less susceptible to fluctuations in amplitude, unlike the conventional detection scheme which obtains the phase from the amplitudes of I, Q signals. Also, since the FSK signal 52 is converted by the comparator 12 to a binary signal which has the amplitude represented by "0" and "1", and the frequency of the FSK signal is detected through digital processing by the 2n-stage shift register 14, inverters 16-1-16-n, and adder 18, the circuit configuration can be simplified without the need for using parts such as an A/D converter.

Figure 15:
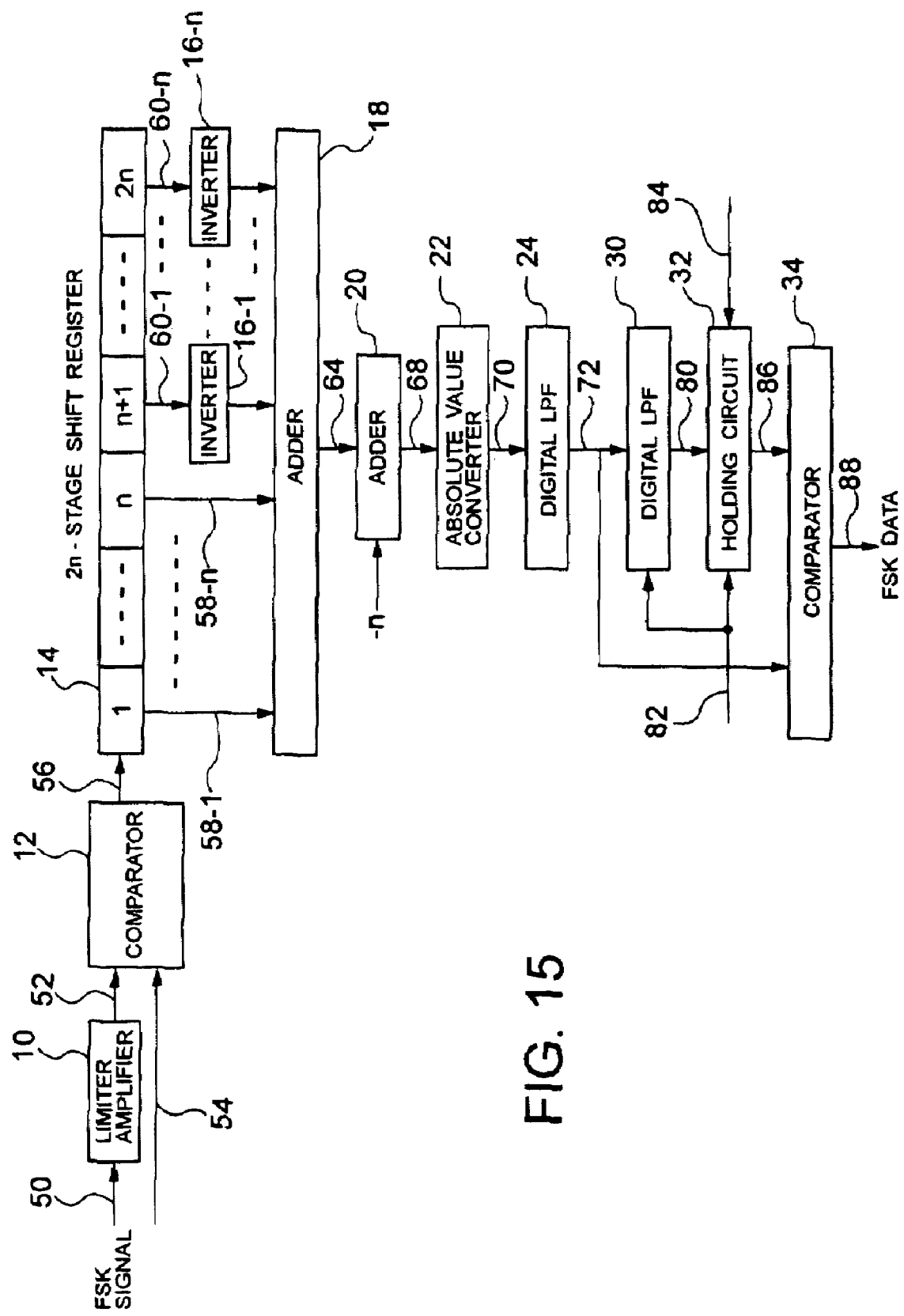
FIG. 15 is a block diagram illustrating another embodiment of the FSK signal detector according to the present invention.

FIG. 15 illustrates another embodiment of the FSK signal detector according to the present invention. In the FSK signal detector illustrated in FIG. 1, the comparator 26 generates the FSK data with reference to the threshold 74 for converting the frequency detection output 72 to the FSK data 76. However, if the frequency $f_{IF}$ of the FSK signal 50 deviates from a specified value to cause a frequency offset present in the FSK signal 50, a DC component of the frequency detection output 72 increases and decreases in accordance with the frequency offset, so that the fixed threshold 74 can cause the comparator 26 to erroneously determine the FSK data.

The embodiment is applied to a communication system in which a preamble pattern having the same number of "0" and "1" in a certain symbol such as repetitions of "0" and "1" is placed at the head of a frame of a received FSK signal. The preamble pattern is detected to obtain an average value of the frequency detection outputs 72 corresponding to the preamble to generate an offset output 80 which varies in accordance with a frequency offset, and the DC component of the frequency detection output 72 is canceled out based on the offset output 80 to prevent an erroneous determination on the FSK data.

As illustrated in FIG. 15, the FSK signal detector of the embodiment comprises a digital LPF 30, a holding circuit 32, and a comparator 34 in place of the comparator 26 in the FSK signal detector illustrated in FIG. 1, but the configuration is identical to the FSK signal detector illustrated in FIG. 1 from the limiter amplifier 10 to the digital LPF 24. In FIG. 15, elements identical to those in FIG. 1 are designated the same reference numerals, and reference numerals added to connection lines represent signals which appear on the connection lines.

Regarding different aspects from the FSK signal detector of FIG. 1, the digital LPF 24 is connected to the digital LPF 30 and comparator 34. The digital LPF 30 averages the frequency detection output 72 delivered from digital LPF 24 over a time for which a plurality of symbols of the preamble or "0" and "1" of a spread code period are even to generate a DC offset which is delivered as an offset output 80. Thus, the offset signal 80 is a DC component of the frequency detection output 72 when the preamble is input, and its level varies in accordance with the frequency offset. The digital LPF 30 starts operating in response to a preamble detection signal 82 applied thereto from the outside.

The holding circuit 32 connected to the digital LPF 30 holds the offset output 80 after the lapse of a predetermined time from the time the preamble detection signal 82 was applied, i.e., when the digital LPF 30 delivers the offset output 90 corresponding to the preamble, and releases the held offset output 80 when a hold release signal 84 is applied thereto from the outside. The preamble detection signal 82 is applied when the apparatus detects the preamble, while the hold release signal 84 is applied upon completion of frame reception. In this way, the holding circuit 32 holds the offset output 80 corresponding to the preamble within a frame, and delivers this as an offset output 86.

In this way, the digital LPF 30 and the holding circuit 32 make up a DC offset generating means which averages the frequency detection output 72 corresponding to the preamble, when it is output from the digital LPF 24, to generate a DC offset which is held during a frame period of the FSK signal.

The comparator 34 connected to the holding circuit 32 and digital LPF 24 compares the frequency detection output 72 with a threshold to generate FSK data in a manner similar to the comparator 26 in FIG. 1. However, the comparator 34 of the embodiment subtracts the offset output 84 from the frequency detection output 72 to generate a frequency detection output (A) from which the influence of the frequency offset is eliminate, and compares the frequency detection output (A) with a threshold having the value of zero to generate FSK data 90.

Figure 16:
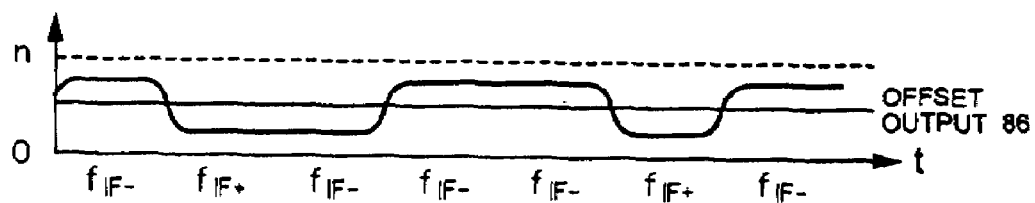
FIG. 16 is a diagram showing a frequency detection output delivered from a digital LPF 25 of the FSK signal detector illustrated in FIG. 15.
Figure 17:
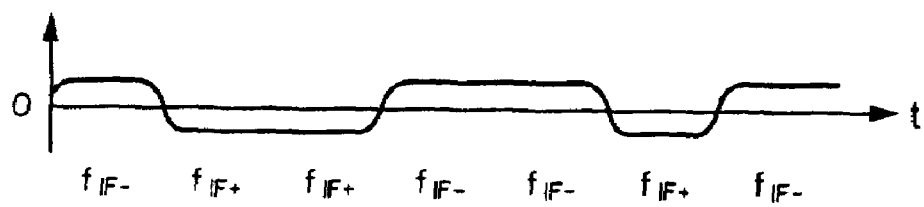
FIG. 17 is a diagram showing a frequency detection output (A) generated in a comparator 34 of the FSK signal detector illustrated in FIG. 15.

For example, with the FSK signal including a frequency offset, as the frequency detection output 72 shown in FIG. 16 is output from the digital LPF 24, the DC component of the frequency detection output 72 varies in accordance with the frequency offset. However, the DC component of the frequency detection output 72 matches with the offset output 86 delivered from the holding circuit 32. Thus, by subtracting the offset output 86 from the frequency detection output 72, the DC component is removed from the frequency detection output 72 to eliminate the influence of the frequency offset. FIG. 17 shows the waveform of the frequency detection output (A) thus generated.

Figure 18:
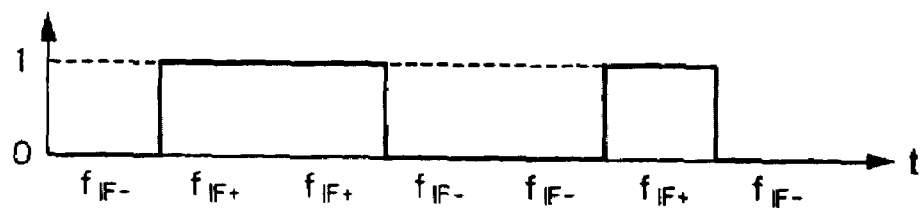
FIG. 18 is a diagram showing FSK data output from the comparator 34 of the FSK signal detector illustrated in FIG. 15.
Figure 19:
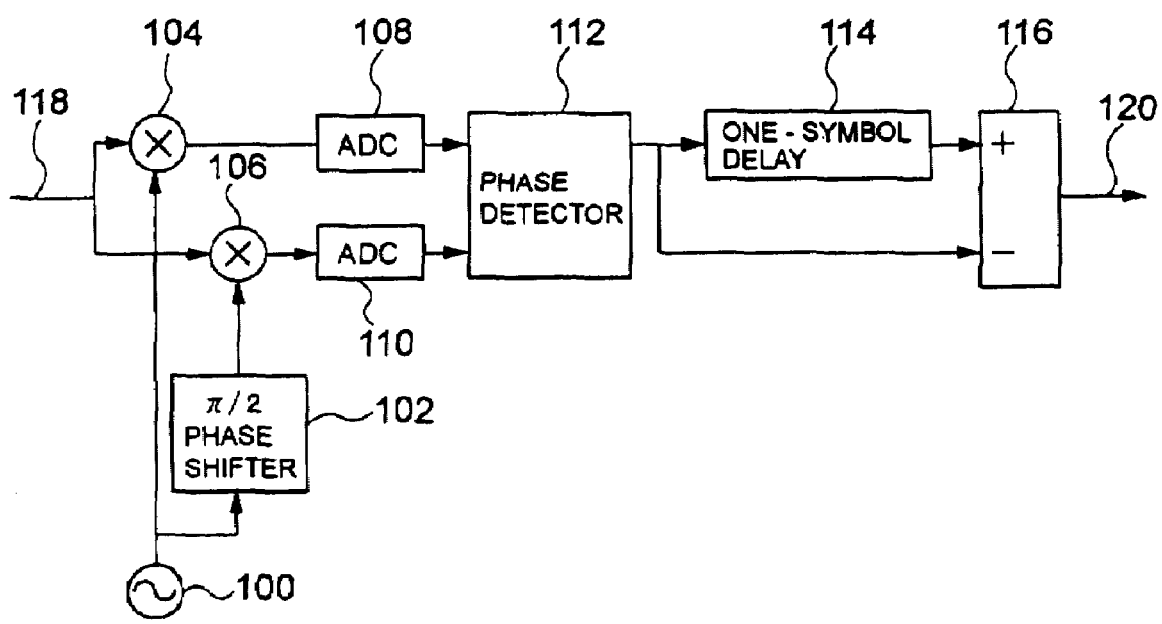
FIG. 19 is a block diagram illustrating an example of a conventional FSK signal detector.

Generally, in the FSK data, "0" corresponds to the FSK signal which is shifted to the frequency $f_{IF-}$, and "1" corresponds to the FSK signal which is shifted to the frequency $f_{IF+}$, respectively. In the comparator 34, the frequency detection output (A) has a positive value when the FSK signal is shifted to the frequency $f_{IF-}$, and having a negative value when the FSK signal is shifted to the frequency $f_{IF+}$, as shown in FIG. 17, so that the comparator 34 generates FSK data 88 which is "0" when the frequency detection output (A) is larger than the threshold which is set to zero, and "1" when the frequency detection output (A) is smaller than the threshold, and outputs the FSK data 88. In this way, the frequency detection output (A), for example, shown in FIG. 17 is converted to the FSK data 88 shown in FIG. 18.

Next, the operation of the FSK signal detector in FIG. 15 will be described. When the 2n-stage shift register 14 is applied with an FSK signal with the frequency shifted $f_{IF-}$ from a defined value to a lower region (for example, by several clocks of the clock CLK (at frequency $f_{CLK}$)), the frequency detection output 64 delivered from the adder 18 has a maximum value of 2n and a minimum value of zero, which are identical to those when the frequency $f_{IF-}$ matches the defined value. However, when the 2n-stage shift register 14 is applied with an FSK signal with the frequency $f_{IF-}$ shifted from the defined value to a higher region, the frequency detection output 64 delivered from the adder 18 has a maximum value smaller than 2n, and a minimum value larger than zero. Thus, the frequency detection output 70 delivered from the absolute value converter 22 is smaller than n. However, the frequency detection output 70 for the FSK signal which is frequency shifted to the frequency $f_{IF+}$ is further smaller than the frequency detection output 70 for the FSK signal which is frequency shifted to the frequency $f_{IF-}$, so that both can be distinguished from each other.

Since the operation of the respective circuits from the limiter amplifier 10 to the digital LPF 24 are similar to those in FIG. 1, description thereon is omitted, and the operation of the circuits subsequent to the digital LPF 30 will be described. When the limiter amplifier 10 is applied with a signal of a preamble pattern having the same number of "0" and "1" in certain symbols such as repetitions of "0", "1" placed at the head of a frame of a received FSK signal, the preamble detection signal 82 is input to the digital LPF 30 and the holding circuit 32 from the outside.

Upon application of the preamble detection signal 82, the digital LPF 30 averages the frequency detection output 72 delivered from the digital LPF 24 over a time in which the numbers of "0" and "1" are equal for several symbols of the preamble or a spread code period, and delivers the result to the holding circuit 32 as the offset output 80. If the FSK signal 50 includes a frequency offset, the offset output 80 varies in accordance with this frequency offset.

When a predetermined time has elapsed after the preamble detection signal 82 was applied, i.e., when the digital LPF 30 calculates and delivers the offset output 80, the holding circuit 32 holds the offset output 80, and releases the held offset output 80 when the hold release signal 84 is applied thereto. Therefore, the holding circuit 32 holds the offset output 80 corresponding to the preamble over one frame. The held offset output is delivered to the comparator 34 as the offset output 86.

The comparator 34 subtracts the offset output 86 delivered from the holding circuit 32 from the frequency detection output 72 delivered from the digital LPF 24. Since this offset output 96 matches with a DC component of the frequency detection output 72, the frequency detection output 72 is converted to the frequency detection output (A) which includes no DC component, resulting in the frequency detection output (A) which is not affected by the frequency offset. The comparator 34 compares the frequency detection output (A) with a threshold having the value of zero to generate and output the FSK data 90.

While the embodiment of FIG. 15 has shown an example which is applied to a demodulator for FSK communication in which a preamble pattern having the same number of "0" and "1" in constant symbols such as repetitions of "0" and "1" is placed at the head of a frame, the present invention can also be used as a demodulator for a spread spectrum communication or the like under the condition that the numbers of "0", "1" of FSK data or MSK data are equal over a constant interval (one symbol duration) using the FSK modulation or MSK (Minimum Shift Keying) modulation because the frequency offset can be precisely canceled out.

As described above, according to the embodiment, the digital LPF 30 and the holding circuit 32 generate the offset output 86 (CD offset) which varies in accordance with a frequency offset included in an FSK signal, the comparator 34 subtracts the offset output 86 from the frequency detection output 72 delivered from the digital LPF 24 to generate the frequency detection output (A) from which the frequency offset is canceled, and this frequency detection output (A) is used to generate FSK data, so that the FSK data can be generated without being affected by the frequency offset.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2003-389033 which is hereby incorporated by reference.

What is claimed:

1. An FSK signal detector comprising:
    binarizing means for binarizing the amplitude of an input FSK signal;
    a 2n-stage shift register comprised of 2n registers for sequentially shifting the FSK signal binarized by said binarizing means in response to a clock; and
    adding means for calculating a sum of a total number of FSK signals having the value of "1" or "0" among FSK signals stored in a first to an n-th register of said 2n-stage shift register and a total number of FSK signals having the value of "0" or "1" among FSK signals stored in an (n+1)th to a 2n-th register.

2. An FSK signal detector according to claim 1, further comprising:
    amplitude limiting means disposed in front of said binarizing means for suppressing an amplitude fluctuation component of the input FSK signal.

3. An FSK signal detector according to claim 1, further comprising:
    FSK data generating means for generating FSK data based on a varying width when the sum calculated by said adding means varies in accordance with the clock supplied to said 2n-stage shift register.

4. An FSK signal detector according to claim 3, wherein said FSK generating means includes:
    subtracting means for subtracting n from the sum calculated by said adding means;
    absolute value converting means for obtaining an absolute value of the output of said subtracting means;
    a low pass filter for averaging the output of said absolute value converting means; and
    comparing means for comparing the output of said low pass filter with a predetermined threshold to generate FSK data.

5. An FSK signal detector according to claim 3, wherein said FSK generating means includes DC offset generating means, operative when the output of said low pass filter corresponds to a preamble added to the head of the FSK signal, for averaging an output corresponding to the preamble to generate a DC offset, and for holding the DC offset for a frame period of the FSK signal,
    wherein said comparing means subtracts the DC offset generated by said DC offset generating means from the output of said low pass filter, and compares the difference with a threshold having the value of zero to generate the FSK data.

6. An FSK signal detector according to claim 5, wherein said preamble is a spread code used in a spread spectrum communication.

7. An FSK signal detector according to claim 1, wherein said clock supplied to said 2n-stage shift register has a frequency $f_{CLK}$ which is set to satisfy $(f_{CLK}/f_{IF-})-(f_{CLK}/f_{IF+})=8$, where $f_{IF-}$ is the frequency of the FSK signal shifted in the negative direction, and $f_{IF+}$ is the frequency of the FSK signal shifted in the positive direction, and the number 2n of stages of said 2n-stage shift register is set to an integer close to the frequency $f_{CLK}$ divided by the frequency $f_{IF-}$.

* * * * *